(12) United States Patent
O'Dell

(10) Patent No.: US 11,132,259 B2
(45) Date of Patent: Sep. 28, 2021

(54) PATCH RECONCILIATION OF STORAGE NODES WITHIN A STORAGE CLUSTER

(71) Applicant: EMC IP Holding Company LLC, Hopkinton, MA (US)

(72) Inventor: Jared William O'Dell, Tacoma, WA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

(21) Appl. No.: 16/588,983

(22) Filed: Sep. 30, 2019

(65) Prior Publication Data

US 2021/0096956 A1    Apr. 1, 2021

(51) Int. Cl.
  *G06F 11/14* (2006.01)
  *G06F 8/658* (2018.01)
  *G06F 8/61* (2018.01)

(52) U.S. Cl.
  CPC ........... *G06F 11/1433* (2013.01); *G06F 8/61* (2013.01); *G06F 8/658* (2018.02); *G06F 11/1464* (2013.01); *G06F 11/1469* (2013.01)

(58) Field of Classification Search
  USPC ...................................................... 717/168
  See application file for complete search history.

(56) References Cited

U.S. PATENT DOCUMENTS

| | | |
|---|---|---|
| 6,161,218 A | 12/2000 | Taylor |
| 6,477,703 B1 | 11/2002 | Smith et al. |
| 7,823,148 B2 | 10/2010 | Deshpande et al. |
| 7,934,211 B2 | 4/2011 | Nguyen et al. |
| 8,387,037 B2 | 2/2013 | Henseler et al. |
| 8,677,348 B1 | 3/2014 | Ramanathpura et al. |
| 8,893,106 B2 | 11/2014 | Ningombam et al. |
| 10,289,400 B2 | 5/2019 | De Zaeytijd et al. |
| 2003/0218628 A1 | 11/2003 | Deshpande et al. |
| 2003/0221190 A1 | 11/2003 | Deshpande et al. |
| 2007/0006209 A1 | 1/2007 | Nguyen et al. |
| 2007/0288423 A1 | 12/2007 | Kimoto |
| 2008/0263535 A1 | 10/2008 | Dias et al. |
| 2011/0225575 A1 | 9/2011 | Ningombam et al. |

(Continued)

OTHER PUBLICATIONS

Office Action dated Mar. 10, 2021 for U.S. Appl. No. 16/718,381, 43 pages.

(Continued)

*Primary Examiner* — John Q Chavis
(74) *Attorney, Agent, or Firm* — Amin, Turocy & Watson, LLP

(57) ABSTRACT

Performing patch reconciliation of storage nodes within a storage cluster is presented herein. A patch reconciliation component receives an upgrade patch request to upgrade a first version of an operating system (OS) on a data storage node of a data storage cluster to a second version of the OS that has been installed on another data storage node of the data storage cluster, the first version preceding the second version; and based on the upgrade patch request, determines a group of upgrade patches to apply to the first version of the OS to facilitate the upgrade, and applies the group of upgrade patches to the first version of the OS resulting in the upgrade of the first version of the OS to the second version of the OS, the group of upgrade patches comprising respective upgrade binary files for the first version of the OS.

20 Claims, 11 Drawing Sheets

(56) References Cited

U.S. PATENT DOCUMENTS

| | | |
|---|---|---|
| 2013/0111458 A1* | 5/2013 | Quin .................. G06F 8/658 717/172 |
| 2013/0125109 A1* | 5/2013 | Scian .................. G06F 8/658 717/171 |
| 2014/0376362 A1 | 12/2014 | Selvaraj et al. |
| 2015/0142728 A1 | 5/2015 | Nigam et al. |
| 2016/0342409 A1 | 11/2016 | Acker et al. |
| 2018/0143821 A1* | 5/2018 | Chittigala ............ H05K 999/99 |
| 2018/0349130 A1 | 12/2018 | Mohammed et al. |
| 2019/0052732 A1* | 2/2019 | Lee .................. G06F 9/455 |
| 2019/0057214 A1* | 2/2019 | Xia .................. G06F 21/44 |
| 2019/0146776 A1* | 5/2019 | Chen .................. G06F 9/445 717/169 |
| 2019/0227787 A1* | 7/2019 | Kumar .................. G06F 8/65 |
| 2019/0236164 A1* | 8/2019 | Felts .................. G06F 16/137 |
| 2019/0334765 A1 | 10/2019 | Jain et al. |
| 2020/0097279 A1 | 3/2020 | Mukhopadhyay et al. |
| 2020/0356354 A1 | 11/2020 | Mitra |
| 2021/0055925 A1 | 2/2021 | Zhu et al. |

OTHER PUBLICATIONS

Office Action dated Nov. 24, 2020 for U.S. Appl. No. 16/718,381, 37 pages.

Office Action dated Feb. 3, 2021 for U.S. Appl. No. 16/714,040, 24 pages.

"Upgrade Methods and Strategies | Upgrading Clusters"; OpenShift. com website [http://web.archive.org/web/20190716081416/https://docs.openshift.com/container-platform/3.9/upgrading/index.html] as captured by the Wayback Machine Internet Archive (archive.org) on Jul. 16, 2019 (Year: 2019), 34 pages.

Office Action dated Jul. 9, 2021 for U.S. Appl. No. 16/714,040, 33 pages.

Office Action dated Jun. 24, 2021 for U.S. Appl. No. 16/718,381, 36 pages.

* cited by examiner

500

510

IN RESPONSE TO RECEIVING AN UPGRADE REQUEST TO UPGRADE A LOW VERSION IMAGE OF AN OS THAT HAS BEEN INSTALLED ON A FIRST STORAGE NODE OF A STORAGE CLUSTER TO A HIGH VERSION IMAGE OF THE OS THAT HAS BEEN INSTALLED ON A SECOND STORAGE NODE OF THE STORAGE CLUSTER, GENERATE, BY A SYSTEM COMPRISING A PROCESSOR, A GROUP OF UPGRADE PATCHES COMPRISING RESPECTIVE UPGRADE BINARY FILES FOR INSTALLATION ON THE LOW VERSION IMAGE OF THE OS

520

CONVERT, BY THE SYSTEM VIA THE GROUP OF UPGRADE PATCHES, THE LOW VERSION IMAGE OF THE OS TO THE HIGH VERSION IMAGE OF THE OS

FIG. 5

PATCH RECONCILIATION OF STORAGE NODES WITHIN A STORAGE CLUSTER

TECHNICAL FIELD

The subject disclosure generally relates to embodiments for patch reconciliation of storage nodes within a storage cluster.

BACKGROUND

Conventionally maintaining and/or updating distinct versions of operating systems on different computing devices of a system is an arduous task—requiring operating system (OS) updates, e.g., binary file updates, on portions of the different computing devices to be manually performed and/or accounted for. Further, as such changes are serially made to a computing device of the different computing devices, it becomes manually prohibitive to account for all of the iterations of binary file updates of different operating system versions between the computing device and remaining computing devices of the computing devices, e.g., when trying to revert, roll back, etc. to an image, version, etc. of an OS of the computing device that was previously installed on the computing device; when trying to revert, roll back, etc. to the image, version, etc. after the image, version, etc. was updated with patches on other device(s) of the different computing devices. Consequently, conventional systems have had some drawbacks, some of which may be noted with reference to the various embodiments described herein below.

BRIEF DESCRIPTION OF THE DRAWINGS

Non-limiting embodiments of the subject disclosure are described with reference to the following figures, wherein like reference numerals refer to like parts throughout the various views unless otherwise specified:

FIG. 5 illustrates a flow chart of a method that generates a group of upgrade patches comprising respective upgrade binary files for installation on a low version image of an OS that has been installed on a storage node of a storage cluster, in accordance with various example embodiments;

DETAILED DESCRIPTION

Figure 1:
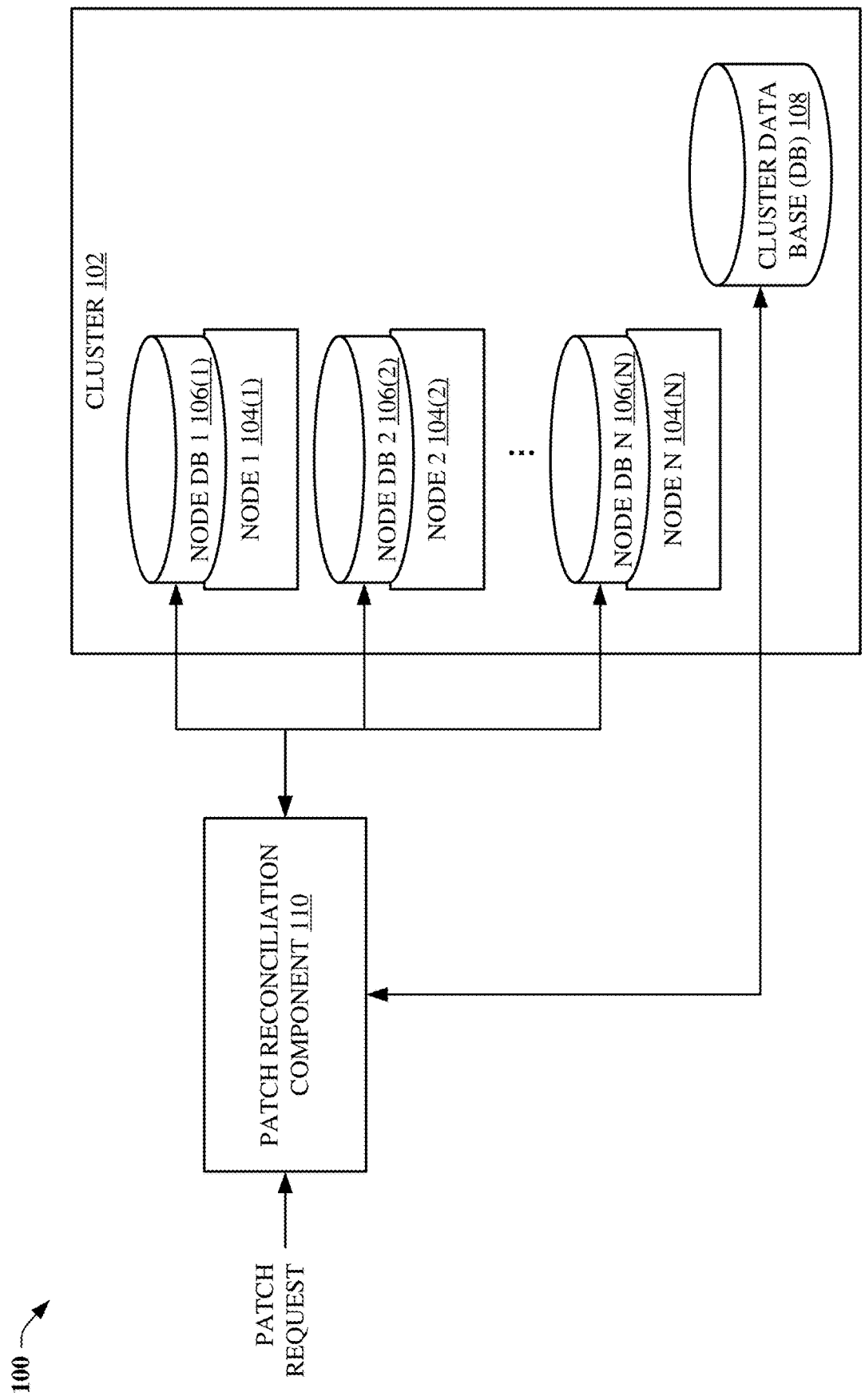
FIG. 1 illustrates a block diagram of a system that performs patch reconciliation of storage nodes within a storage cluster, in accordance with various example embodiments.

Aspects of the subject disclosure will now be described more fully hereinafter with reference to the accompanying drawings in which example embodiments are shown. In the following description, for purposes of explanation, numerous specific details are set forth in order to provide a thorough understanding of the various embodiments. However, the subject disclosure may be embodied in many different forms and should not be construed as limited to the example embodiments set forth herein.

As described above, conventional systems have had some drawbacks with respect to maintaining and/or updating distinct versions of operating systems on different computing devices of a system—requiring binary updates of portions of the distinct versions of the OS to be manually performed and/or accounted for on the different computing devices. Further, it becomes manually prohibitive to account for all of the iterations of binary file updates between different operating system versions that have been installed on the different computing devices, e.g., when reverting, rolling back, etc. to an OS version on a computing device of the computing devices after such version had been installed, and subsequently updated with patches, on other device(s) of the different computing devices.

On the other hand, various embodiments disclosed herein can effectively account for patch differences between different versions of an OS that have been installed on respective computing devices of a system, e.g., when upgrading/downgrading one of the versions, by determining an optimized set of operations to correct for the patch differences between the different versions of the OS.

For example, a system, e.g., a distributed file system, an elastic cloud storage (ECS) system, computing system, etc. can comprise a processor; and a memory that stores executable components that, when executed by the processor, facilitate performance of operations by the system, the executable components comprising: a patch reconciliation component comprising an upgrade component and a downgrade component. The upgrade component can receive an upgrade patch request to upgrade a first version, e.g., low OS version, of an OS that has been installed on a first data storage node of a group of data storage nodes of a data storage cluster to a second version, e.g., high OS version, of the OS that has been installed on a second data storage node of the group of data storage nodes, the low OS version of the OS preceding, directly preceding, etc. the high OS version of the OS. In this regard, in embodiment(s), the high OS version comprises a current, most recent, etc. version of the OS, and the low OS version comprises a previous, older, etc. version of the OS.

Further, based on the upgrade patch request, the upgrade component determines a group of patches, upgrade patches, etc. to apply to the first version of the OS to facilitate the upgrade of the first version of the OS, e.g., low OS version, to the second version of the OS, e.g., high OS version—the group of upgrade patches comprising respective upgrade binary files for the first version of the OS. In turn, the upgrade component applies the group of upgrade patches to the first version of the OS—resulting in the upgrade of the first version of the OS to the second version of the OS.

In an embodiment, the upgrade component determines the group of upgrade patches to apply to the first version of the OS by reconciling patch differences between low OS version patches that have been applied to the first version of the OS that has been installed on the first data storage node, and a target group of patches comprising a series of patches that should be installed on an initial release of the first version of the OS, having no patches installed, to facilitate a change of the initial release of the first version of the OS to the second version of the OS.

In this regard, in embodiment(s), the upgrade component reconciles the patch differences between the low OS version patches that have been applied to the first version of the OS and the target group of patches by: determining, from a cluster data structure of the data storage cluster, the target group of patches; generating a target patch operations list comprising non-duplicative target patch operations of the target group of patches; determining, from a node data structure of the second data storage node, high OS version patches that have been applied to the second version of the OS that has been installed on the second data storage node; and generating an actual patch operations list comprising non-duplicative high OS version patch operations of the high OS version patches.

Further, based on the target operations list and the actual operations list, the upgrade component generates a final patch reconciliation list comprising an ordered list of patch operations to be applied to the first version of the OS to facilitate changing a state of the first version of the OS to a current state of the second version of the OS.

In one embodiment, the upgrade component records, in a node data structure of the first data storage node, the group of upgrade patches that was applied to the first version of the OS.

In another embodiment, the downgrade component can receive a rollback patch request to roll back, downgrade, etc. the second version, e.g., high OS version, of the OS to the first version, e.g., low OS version, of the OS that has been installed on the first data storage node. Further, based on the roll back patch request, the downgrade component: determines a group of roll back patches to apply to the second version of the OS to facilitate the roll back of the second version of the OS; and applies the group of roll back patches to the second version of the OS—resulting in the roll back of the second version of the OS to the first version of the OS—the group of roll back patches comprising respective roll back binary files for the second version of the OS.

In yet another embodiment, the downgrade component determines the group of roll back patches to apply to the second version of the OS by: determining, from a first node data structure of the second data storage node, a group of high OS version patches that have been applied to the second version of the OS; generates a high OS version patch list comprising non-duplicative patch operations of the group of high OS version patches that have been applied to the second version of the OS; determines from a second node data structure of the first data storage node, a group of low OS version patches that have been applied to the first version of the OS; and generates a low OS version patch list comprising second non-duplicative patch operations of the group of low OS version patches that have been applied to the first version of the OS.

Further, based on the high OS version patch list and the low OS version patch list, the downgrade component generates a final patch reconciliation list comprising an ordered list of patch operations to be applied to the second version of the OS to facilitate changing a state of the second version of the OS to a current state of the first version of the OS.

In turn, the downgrade component, based on the final patch reconciliation list, uninstalls at least a portion of the group of high OS version patches from the second version of the OS to change the state of the second version of the OS to the current state of the first version of the OS.

In an embodiment, the downgrade component can record, in the first node data structure of the second data storage node, the portion of the group of high OS version patches that were uninstalled from the second version of the OS.

In one embodiment, a method, e.g., to facilitate patch reconciliation of storage nodes within a storage cluster, comprises: in response to receiving an upgrade request to upgrade a low version image of an OS that has been installed on a first storage node of a storage cluster to a high version image of the OS that has been installed on a second storage node of the storage cluster, generating, by a system comprising a processor, a group of upgrade patches comprising respective upgrade binary files to facilitate installation of the respective upgrade binary files on the low version image of the OS; and converting, by the system via the group of upgrade patches, the low version image of the OS to the high version image of the OS—the low version image of the OS preceding, directly preceding, etc. the high version image of the OS. In this regard, in embodiment(s), the high version image of the OS comprises a current, most recent, etc. version of the OS, and the low version image of the OS comprises a previous, older, etc. version of the OS.

In another embodiment, the generating the group of upgrade patches comprises: determining, using a cluster data store of the storage cluster, a target patch operations list comprising a group of patch installation operations that should be performed on the low version image of the OS, having no patches installed, to facilitate conversion of the low version image of the OS into the high version image of the OS; and determining, using a node data store of the first storage node, a node patch operations list comprising a summary of patch installation operations that have been performed on the low version image of the OS.

Further, the method comprises generating, by the system, a patch reconciliation operations list by: determining, starting from respective beginnings of the node patch operations list and the target patch operations list, respective differences between the node patch operations list and the target patch operations list; determining, starting from an end of the node patch operations list, a node patch operation difference of the respective differences corresponding to the node patch operations list; copying the node patch operation difference to the patch reconciliation operations list; and in response to the node patch operation difference being determined to be an install operation of a patch, re-labeling on the patch reconciliation operations list, the install operation as a delete operation, the delete operation representing that the patch will be uninstalled from the low version image of the OS in a reverse order that the patch was originally installed in the low version image of the OS.

In turn, the generating the patch reconciliation operations list further comprises: determining, by the system starting from a beginning of the target patch operations list, a target patch operation difference of the respective differences corresponding to the target patch operations list; and copying, by the system, the target patch operation difference to the patch reconciliation operations list—the target patch operation difference comprising an install operation of a patch representing that the patch will be installed on the low version image of the OS in the same order that the patch was originally installed on the high version image of the OS.

In yet another embodiment, the method further comprises: in response to receiving a downgrade request to downgrade the high version image of the OS that has been installed on the second storage node to the low version image of the OS that has been installed on the first storage node, generating, by the system, a group of downgrade patches comprising respective downgrade binary files for installation on the high version image of the OS to facilitate downgrading the high version image of the OS to the low version image of the OS; and converting, by the system via the group of downgrade patches, the high version image of the OS to the low version image of the OS.

In an embodiment, the method further comprises: based on the group of downgrade patches, generating a patch reconciliation list comprising an ordered list of patch operations to be applied to the high version image of the OS to facilitate, based on the patch reconciliation list, the converting the high version image of the OS to the low version image of the OS.

Another embodiment can comprise a machine-readable storage medium comprising instructions that, in response to execution, cause a system comprising a processor to perform operations, comprising: receiving a patch request to upgrade or downgrade a first image of a first version of an OS to a second image of a second version of the OS—the first image being installed on a first data storage node of a group of data storage nodes of a data storage cluster, and the second image being installed on a second data storage node of the group of data storage nodes; in response to the patch request being determined to be compatible with the first image, determining a group of patch operations to be performed on the first image to facilitate upgrading or downgrading the first image into the second image of the second version of the OS, and based on the group of patch operations, upgrading or downgrading the first image into the second image.

In an embodiment, the determining the group of patch operations comprises: reconciling differences between node patch operations that have been performed on the first image, and cluster patch operations that are expected to be performed on a high version image of the OS that has been installed on a portion of the group of data storage nodes of the data storage cluster.

As described above, conventional systems have had some drawbacks with respect to maintaining and/or updating distinct versions of operating systems on different computing devices of a system. In contrast, and now referring to FIG. 1, in various embodiments described herein, a patch reconciliation component (110) can effectively account for patch differences between different versions of an OS that have been installed on respective computing devices of a system, e.g., when upgrading/downgrading one of the versions, by determining an optimized set of operations to correct for the patch differences. In this regard, a system (100) comprising the patch reconciliation component can comprise, e.g., a distributed file system, an ECS system, a parallel distributed networked file system, a OneFS™ file system provided by Dell EMC® Isilon Systems (e.g., utilizing a FreeBSD based operating system), etc. In embodiment(s), the distributed file system can comprise a host server, a client server, etc. In other embodiment(s), various components of the distributed file system can be included in a host application, a client application, storage/data services, etc.

Figure 10:
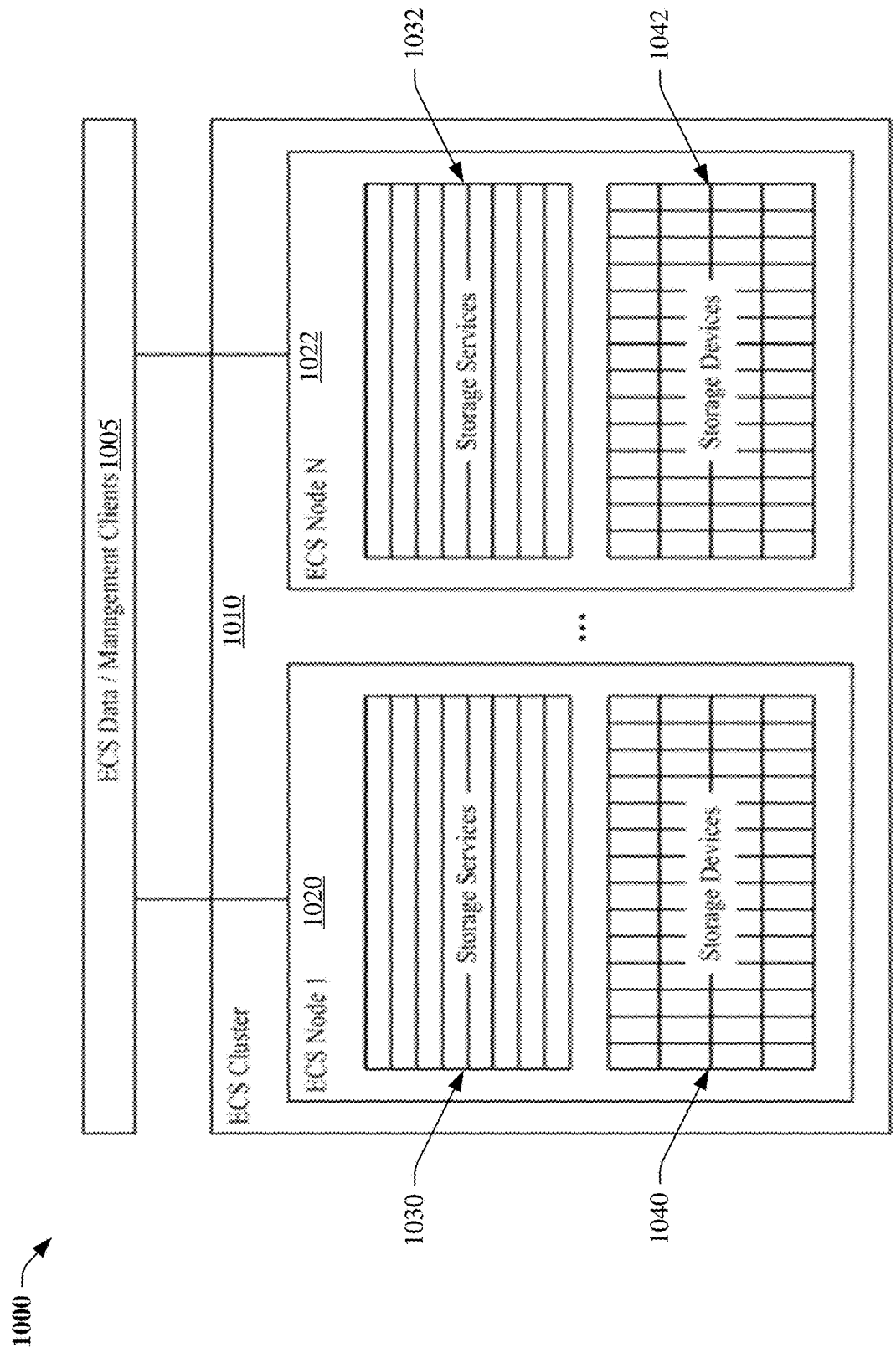
FIG. 10 illustrates a block diagram of an elastic cloud storage (ECS) system, in accordance with various example embodiments.

Referring now to FIG. 10, a Dell EMC® Isilon file storage system (1000) can comprise a cloud-based object storage appliance (e.g., comprising storage control software, components (e.g., 110, 210, 220, etc.); ECS data clients/management clients (1005); storage services (1030, 1032) and storage devices (1040, 1042) (e.g., comprising storage media, physical magnetic disk media, solid-state drive (SSD) media, e.g., flash storage, etc.) of a storage cluster (102, 1010). In this regard, the cloud-based object storage appliance is a type of clustered file system that spreads data across multiple storage nodes (104(1), 104(2), 104(N), 1020, 1022), e.g., usually for redundancy or performance. Further, such clustered file system can simultaneously be mounted on multiple file servers (not shown), e.g., OneFS™ clusters, and can provide features like location-independent addressing and redundancy which can improve reliability and/or reduce the complexity of portion(s) of a cluster (e.g., 102), e.g., storage cluster, data storage cluster, data cluster, etc.

As illustrated by FIG. 10, the storage service(s) and storage device(s) can be included in respective data storage nodes (104(1), 104(2), 104(N), 1020, 1022) of clusters (102, 1010), e.g., storage clusters, data storage clusters, data clusters, etc., e.g., combined as an integrated system—with no access to the storage devices other than through the Dell EMC® Isilon file storage system. In this regard, the respective nodes, storage nodes, data storage nodes, etc. can be communicatively and/or operatively coupled to each other, with the storage service(s) comprising respective processes, processing jobs, job worker processes, applications, etc. that can be utilized to service user requests according to user-based storage policies.

In general, the respective data storage nodes can communicate with user devices via wired and/or wireless communication network(s) to provide access to services that are based in the cloud and not stored locally (e.g., on a user device). A typical cloud-computing environment can include multiple layers, aggregated together, which interact with each other to provide resources for end-users.

The Dell EMC® Isilon file storage system can support storage, manipulation, and/or analysis of unstructured data on a massive scale on commodity hardware. As an example, the Dell EMC® Isilon file storage system can support mobile, cloud, big data, and/or social networking applications. In another example, the Dell EMC® Isilon file storage system can be deployed as a turnkey storage appliance, or as a software product that can be installed on a set of qualified commodity servers and disks, e.g., within a node, data storage node, ECS node, etc. of a cluster, data storage cluster, ECS cluster, etc. In this regard, the Dell EMC® Isilon file storage system can comprise a cloud platform that comprises at least the following features: (i) lower cost than public clouds; (ii) unmatched combination of storage efficiency and data access; (iii) anywhere read/write access with strong consistency that simplifies application development; (iv) no single point of failure to increase availability and performance; (v) universal accessibility that eliminates storage silos and inefficient extract, transform, load (ETL)/data movement processes; etc.

In embodiment(s), the Dell EMC® Isilon file storage system can write all object-related data, e.g., user data, metadata, object location data, etc. to logical containers of contiguous disk space, e.g., such containers comprising a group of blocks of fixed size (e.g., 128 MB) known as chunks. Data is stored in the chunks and the chunks can be shared, e.g., one chunk can comprise data fragments of different user objects. Chunk content is modified in append-only mode, e.g., such content being protected from being erased or overwritten for a specified retention period. When a chunk becomes full enough, it is sealed and/or closed—becoming immutable, e.g., read-only and delete only.

Further, a storage node (104(1), 104(2), 104(N), 1020, 1022) of the cluster (102) can comprise a system (100), a server, a file system, an image of the OS, data service(s), computer processing unit(s) (CPU(s)), storage devices (e.g., non-volatile memory devices, disk drives, solid-state drives, etc.), memory devices, (e.g., volatile memory devices, random access memory, etc.

Figure 2:
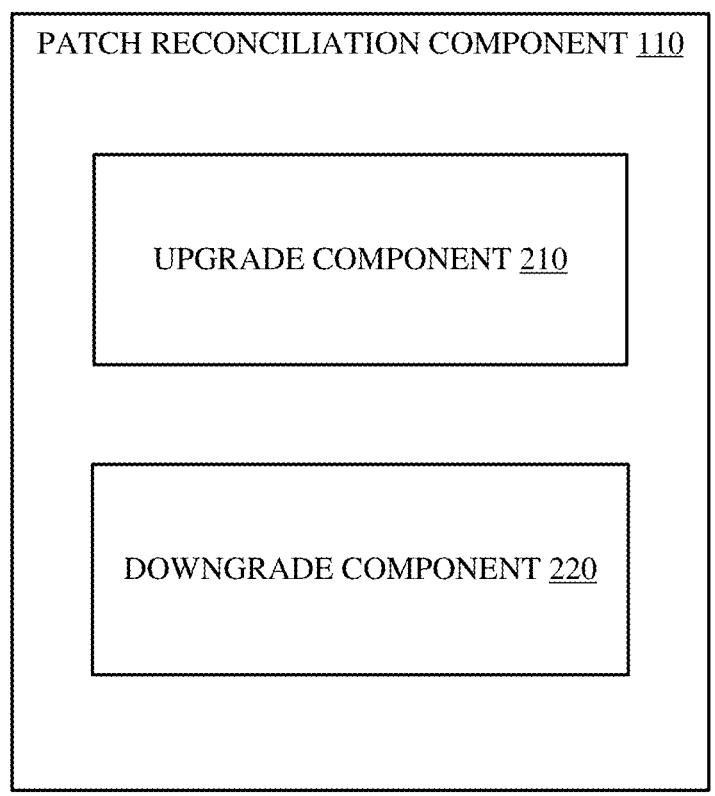
FIG. 2 illustrates a block diagram of a patch reconciliation component, in accordance with various example embodiments.

Referring again to FIGS. 1 and 2, the system (100) can comprise a patch reconciliation component (110) comprising an upgrade component (210) and a downgrade component (220). The upgrade component can receive a patch request, e.g., an upgrade patch request, to upgrade a first version, e.g., low OS version, of an OS that has been installed on a first data storage node of a group of data storage nodes (104(1), 104(2), 104(N)) of a data storage cluster (102) to a second version, e.g., high OS version, of the OS that has been installed on a second data storage node of the group of data storage nodes, the low OS version of the OS preceding, directly preceding, etc. the high OS version of the OS. In this regard, in embodiment(s), the high OS version comprises a current, most recent, etc. version of the OS, and the low OS version comprises a previous, older, etc. version of the OS.

Further, based on the upgrade patch request, the upgrade component determines a group of patches, upgrade patches, etc. to apply to the first version of the OS to facilitate the upgrade of the first version of the OS, e.g., low OS version, to the second version of the OS, e.g., high OS version—the group of upgrade patches comprising respective upgrade binary files for the first version of the OS. In turn, the upgrade component applies the group of upgrade patches to the first version of the OS—resulting in the upgrade of the first version of the OS to the second version of the OS.

In embodiment(s), the group of the upgrade patches comprises a package of executables, e.g., binary files, comprising a set, group, etc. of binary files that supplement or replace original binary files of a defined version of the OS, e.g., low OS version, high OS version, etc. It should be appreciated that in various embodiments disclosed herein, different versions of the OS represent respective changes in scope, features, etc. of the OS of a defined nature that merit delineating such changes, differences, etc. by discrete and successive version numbers of the OS representing the respective changes in scope, features, etc. between the different versions.

In turn, respective sets, groups, etc. of patches can be installed, applied, etc. to different versions of the OS, e.g., low OS version, high OS version, etc., e.g., upgrade patches being applied to, installed on, etc. the low OS version; and downgrade, rollback, etc. patches being applied to, installed on, etc. the high OS version. Further, such patches can be used to fix bugs, include new features, include new firmware, etc. of the different versions without having to replace a full image of the OS on the system. In this regard, upgrades performed by system(s), component(s), etc. (100, 110, 210) as described herein comprise applying, installing, etc. a subset of files, patches, set of patches, group of patches, etc. to, on top of, etc. a pre-existing release, version, etc. of the OS, e.g., low OS version, low version image of the OS, etc. Further, downgrades performed by system(s), component(s), etc. (100, 110, 210) as described herein comprise applying, installing, etc. a subset of files, patches, set of patches, group of patches, etc. to, on top of, etc. a pre-existing release, version, etc. of the OS, e.g., high OS version, high version image of the OS, etc.

The following description provides additional information regarding patch reconciliation performed by various systems and components described herein.

Patch reconciliation is a process that enables the patch reconciliation component, a node acting as a master of other nodes of a cluster (e.g., the patch reconciliation component being installed as part of a service of the node), etc. to automatically (e.g., without human interaction after receiving a request to upgrade/downgrade a node of the cluster, all nodes of the cluster, etc.) identify and correct for patch differences between respective patches that are installed on, e.g., the low/high OS version, of the OS that has been installed on the node, and target patches that should be installed on the low/high OS version of the OS that has been installed on all nodes in the cluster. In this regard, patches can contain dependencies and conflicts with other patches, and therefore must be installed in the correct order to satisfy the requirements of the patches.

The primary use case for patch reconciliation is to allow a customer to install a patch during an OS upgrade of a node, in which some nodes of a cluster have been upgraded to a new version, e.g., the high OS version, and remaining nodes—including the node—of the cluster are still running the previous version, e.g., the low OS version, of the OS. This can happen with a rolling upgrade, or if a customer decides to only upgrade a small sample of nodes to test the new version, e.g., the high OS version, of the OS.

In another example, when a software/firmware bug is encountered on a version of the OS, e.g., the low/high OS version, then a patch will need to be installed in the version to fix the software/firmware bug since the patch will be version specific and will only apply to a subset of nodes in the cluster at the time that the patch is applied.

In yet another example, as additional nodes of a cluster are upgraded or rolled back, the nodes that were running an incompatible OS version when the patch was originally applied will need a process, method, etc. to have the latest, up-to-date, etc. patch changes applied.

Regarding the above examples, in various embodiment(s), the patch reconciliation component can perform the following operations with respect to upgrading a node:

The patch reconciliation component starts by determining a "target operations list" ("target oplist"). This will be a list of all patch operations that should be installed on nodes in the cluster assuming that no patches are currently installed on the node. The target oplist is determined by querying the previous patch jobs to get, obtain, derive, etc. an ordered list of all previous install and delete operations. The target oplist will then be optimized using these two steps in order:

(1) Where multiple entries reference the same patch, keep only the most recent entry. For example, if "patch-1" is installed, removed, and installed again, this is three patch operations. The patch reconciliation component will remove all but the last install operation from the ordered list.

(2) Where the one remaining operation listed for a patch is a delete operation, the patch reconciliation component will remove the delete operation from the ordered list.

The resulting list is called the target oplist, and will contain only the patch installation operations to install all required patches—assuming that the node did not already have any patches applied. In reality, the node that is running the patch reconciliation process will most likely already have patches applied. To account for this, the patch reconciliation component will create an "actual oplist" to reflect the patches that are actually installed on the node at the time the patch reconciliation process is run.

The actual oplist is determined by querying the list of patch requests on the node. As with the target oplist, this will be optimized by the patch reconciliation component using the same two-step method by first removing duplicate operations, and then removing delete operations. The remaining list of operations will contain only the patch installation operations to install the patches currently installed on the node assuming that the node did not already have any patches applied.

The target oplist and the actual oplist are used together to generate a final patch reconciliation oplist that will be used to correct for missing or additional patches on the node. The steps performed by the patch reconciliation component to generate the final patch reconciliation oplist are as follows:

(1) Starting at the beginning of each list (the target oplist and the actual oplist), the patch reconciliation component compares each corresponding operation from each list. For example, the patch reconciliation component compares the first operation from the actual and target oplists, then compares the second operation from each list, and so on— determining, noting, etc. points, areas, etc. where the two lists differ.

(2) Starting at the end of the actual oplist, and working backwards from the actual oplist to the point where the actual oplist and the target oplist differ, the patch reconciliation component copies the operations to the final patch reconciliation oplist, except re-labels the install operations as delete operations. These are the patches that will be uninstalled from the node at the beginning of the reconciliation process in the reverse order that they were originally installed.

(3) Starting at the point of the target oplist where the actual oplist and the target oplist differ, and working forwards to the end of target oplist, the patch reconciliation component copies the operations to the final patch reconciliation list as install operations. These are the patches that will be installed on the node in the same order that they were originally installed on the cluster.

The order is important because of the conflict and dependencies between patches. When a customer requests to install a patch on a cluster, the patch reconciliation component executes conflict and dependency checks against the currently installed patches. By maintaining the correct order, the conflict and dependency checks will also be satisfied in the patch reconciliation process.

Once the final patch reconciliation oplist is validated and it is confirmed that all conflict and dependency checks will be satisfied for each operation in the final patch reconciliation oplist as it is applied, then the patch reconciliation component executes patch operations in the final patch reconciliation oplist one at a time on the node. This will perform the actual work of installing or removing patches on the node. Once complete, the patches on the node will match the patches that have been requested to be installed across all nodes and the cluster.

In this regard, the patch reconciliation component takes into account duplicate operations, and factors in patches that are already installed on the node. It also accounts for patch conflicts and dependencies by maintaining the original patch operation order and enforcing conflicts and dependencies on the original patch requests.

Returning now to FIGS. 1 and 2, in embodiment(s), the upgrade component determines the group of upgrade patches to apply to the first version of the OS by reconciling patch differences between low OS version patches that have been applied to the first version of the OS that has been installed on the first data storage node, e.g., represented by the actual oplist, and a target group of patches, e.g., represented by the target oplist, comprising a series of patches that should be installed on an initial release of the first version of the OS, having no patches installed, to facilitate a change of the initial release of the first version of the OS to the second version of the OS.

In this regard, in embodiment(s), the upgrade component reconciles the patch differences between the low OS version patches that have been applied to the first version of the OS and the target group of patches as follows:

First, the upgrade component determines, from a cluster data structure (e.g., cluster data base (DB) 108) of the data storage cluster (e.g., cluster 102) the target group of patches. Further, the upgrade component generates a target patch operations list comprising non-duplicative target patch operations of the target group of patches.

In turn, the upgrade component determines, from a node data structure (e.g., node DB 1 106(1), node DB 2 106(2), node DB N 106(N), etc.) of the second data storage node (e.g., node 1 104(1), node 2 104(2), node N 104(N)), high OS version patches that have been applied to the second version of the OS that has been installed on the second data storage node; and generating an actual patch operations list comprising non-duplicative high OS version patch operations of the high OS version patches.

Further, based on the target operations list and the actual operations list, the upgrade component generates a final patch reconciliation list, e.g., the final patch reconciliation oplist, comprising an ordered list of patch operations to be applied to the first version of the OS to facilitate changing a state of the first version of the OS to a current state of the second version of the OS.

In one embodiment, the upgrade component records, in the node data structure of the first data storage node, the group of upgrade patches that was applied to the first version of the OS.

In other embodiment(s), the downgrade component can receive a rollback patch request to roll back, downgrade, etc. the second version, e.g., high OS version, of the OS to the first version, e.g., low OS version, of the OS that has been installed on the first data storage node. Further, based on the roll back patch request, the downgrade component: determines a group of roll back patches to apply to the second version of the OS to facilitate the roll back of the second version of the OS; and applies the group of roll back patches to the second version of the OS—resulting in the roll back of the second version of the OS to the first version of the OS—the group of roll back patches comprising respective roll back binary files for the second version of the OS.

In an embodiment, the downgrade component determines the group of roll back patches to apply to the second version of the OS as follows:

First, the downgrade component determines, from a first node data structure (e.g., node DB 1 106(1), node DB 2 106(2), node DB N 106(N), etc.) of the second data storage node, a group of high OS version patches that have been applied to the second version of the OS.

Next, the downgrade component generates a high OS version patch list comprising non-duplicative patch operations of the group of high OS version patches that have been applied to the second version of the OS. Further, the downgrade component determines, from a second node data structure (e.g., node DB 1 106(1), node DB 2 106(2), node DB N 106(N), etc.) of the first data storage node, a group of low OS version patches that have been applied to the first version of the OS; and generates a low OS version patch list comprising second non-duplicative patch operations of the group of low OS version patches that have been applied to the first version of the OS.

In turn, based on the high OS version patch list and the low OS version patch list, the downgrade component generates a final patch reconciliation list comprising an ordered list of patch operations to be applied to the second version of the OS to facilitate changing a state of the second version of the OS to a current state of the first version of the OS.

Further, the downgrade component, based on the final patch reconciliation list, uninstalls at least a portion of the group of high OS version patches from the second version of the OS to change the state of the second version of the OS to the current state of the first version of the OS.

In an embodiment, the downgrade component can record, in the first node data structure of the second data storage node, the portion of the group of high OS version patches that were uninstalled from the second version of the OS.

FIGS. 3-9 illustrate methodologies for performing patch reconciliation of storage nodes within a storage cluster of a system (e.g., 100) during an upgrade/downgrade of an OS of the system, in accordance with various example embodiments. For simplicity of explanation, the methodologies are depicted and described as a series of acts. It is to be understood and appreciated that various embodiments disclosed herein are not limited by the acts illustrated and/or by the order of acts. For example, acts can occur in various orders and/or concurrently, and with other acts not presented or described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Figure 3:
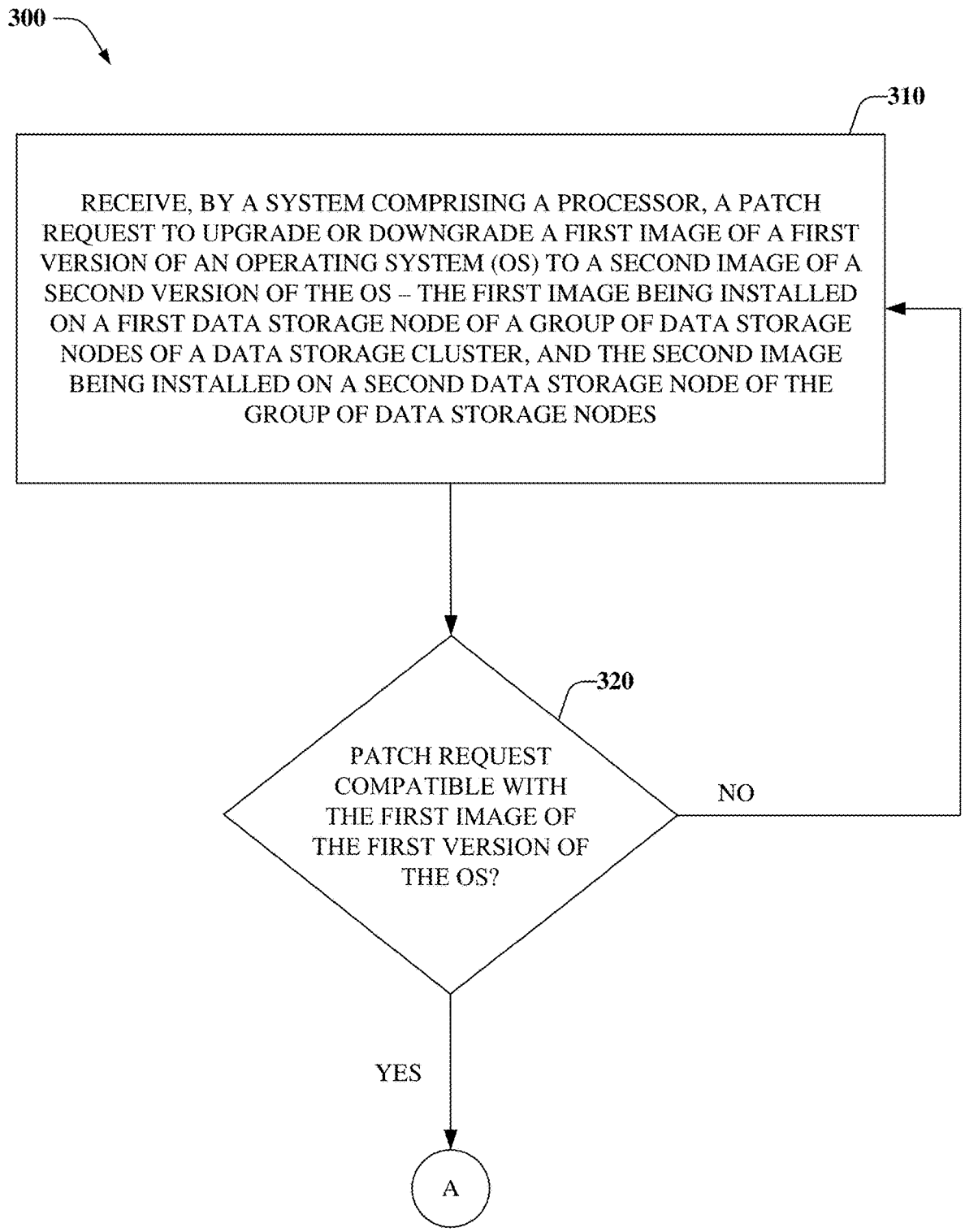
FIGS. 3-4 illustrate flow charts of a method that determines a group of patch operations to be performed on a first image of a first version of an OS, which is installed on a first data storage node of a group of data storage nodes of a data storage cluster, to facilitate upgrading or downgrading the first image into a second image of a second version of the OS that is installed on a second data storage node of the group of data storage nodes, in accordance with various example embodiments.
Figure 4:
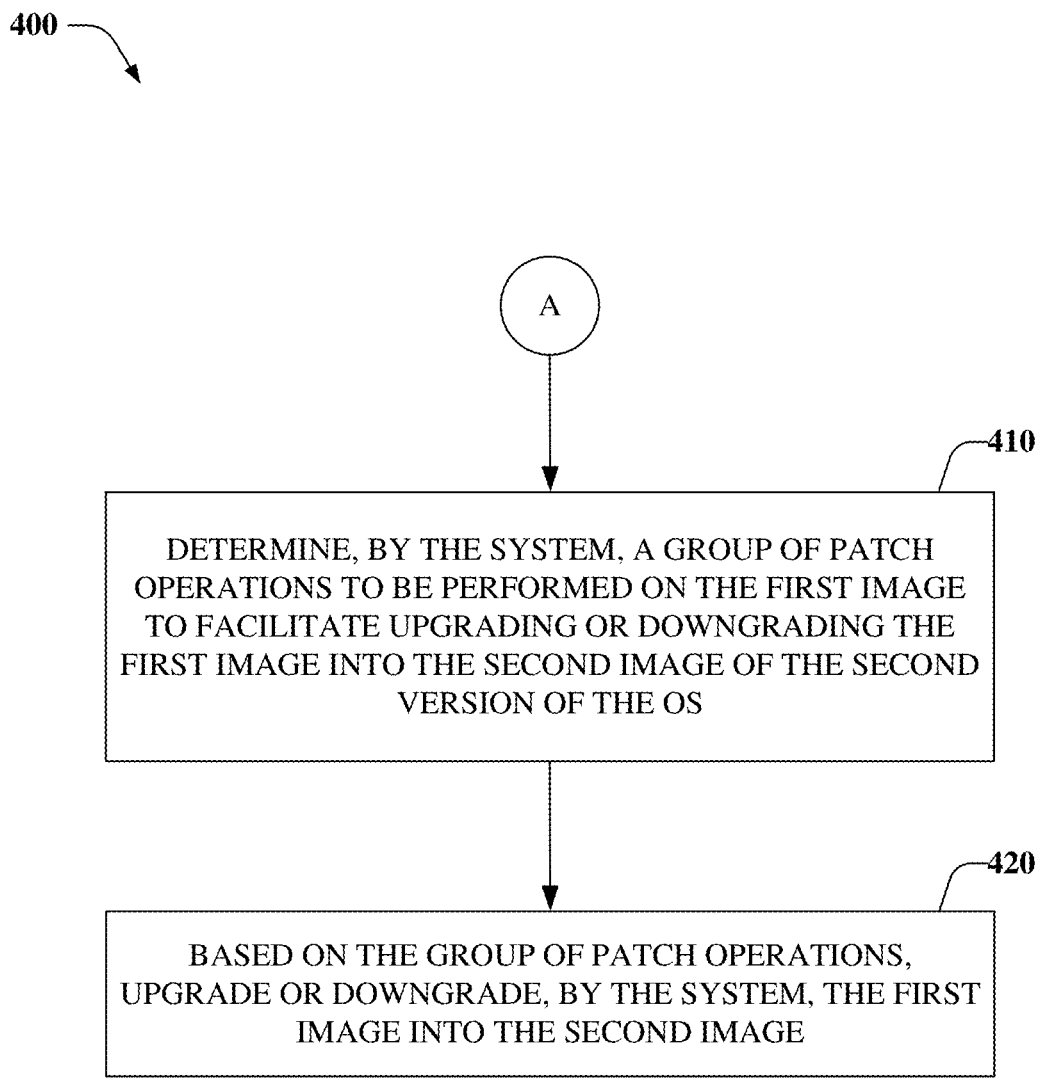

Referring now to FIGS. 3 and 4, flow charts of a method that determines a group of patch operations to be performed on a first image of a first version of an OS, which is installed on a first data storage node of a group of data storage nodes of a data storage cluster, to facilitate upgrading or downgrading the first image into a second image of a second version of the OS that is installed on a second data storage node of the group of data storage nodes are illustrated, in accordance with various example embodiments At 310, a system (e.g., 100) comprising a processor can receive a patch request to upgrade or downgrade a first image of a first version, e.g., low OS version, of an OS to a second image of a second version of the OS, e.g., high OS version—the first image being installed on a first data storage node of a group of data storage nodes of a data storage cluster of the system, and the second image being installed on a second data storage node of the group of data storage nodes.

At 320, the system can determine whether the patch request is compatible with the first image of the first version of the OS. In this regard, in response to the patch request being determined to be compatible with the first image, flow continues to 410, at which the system can determine a group of patch operations to be performed on the first image to facilitate upgrading or downgrading the first image into the second image of the second version of the OS; otherwise flow returns to 310. Flow continues from 410 to 420, at which the system can upgrade or downgrade the first image into the second image based on the group of patch operations.

FIG. 5 illustrates a flow chart of a method that generates a group of upgrade patches comprising respective upgrade binary files for installation on a low version image of an OS that has been installed on a storage node of a storage cluster, in accordance with various example embodiments.

At 510, in response to receiving an upgrade request to upgrade a low version image of an OS that has been installed on a first storage node of a storage cluster to a high version image of the OS that has been installed on a second storage node of the storage cluster, the system can generate a group of upgrade patches comprising respective upgrade files for installation on the low version image of the OS.

At 520, the system can convert, via the group of upgrade patches, the low version image of the OS to the high version image of the OS.

Figure 6:
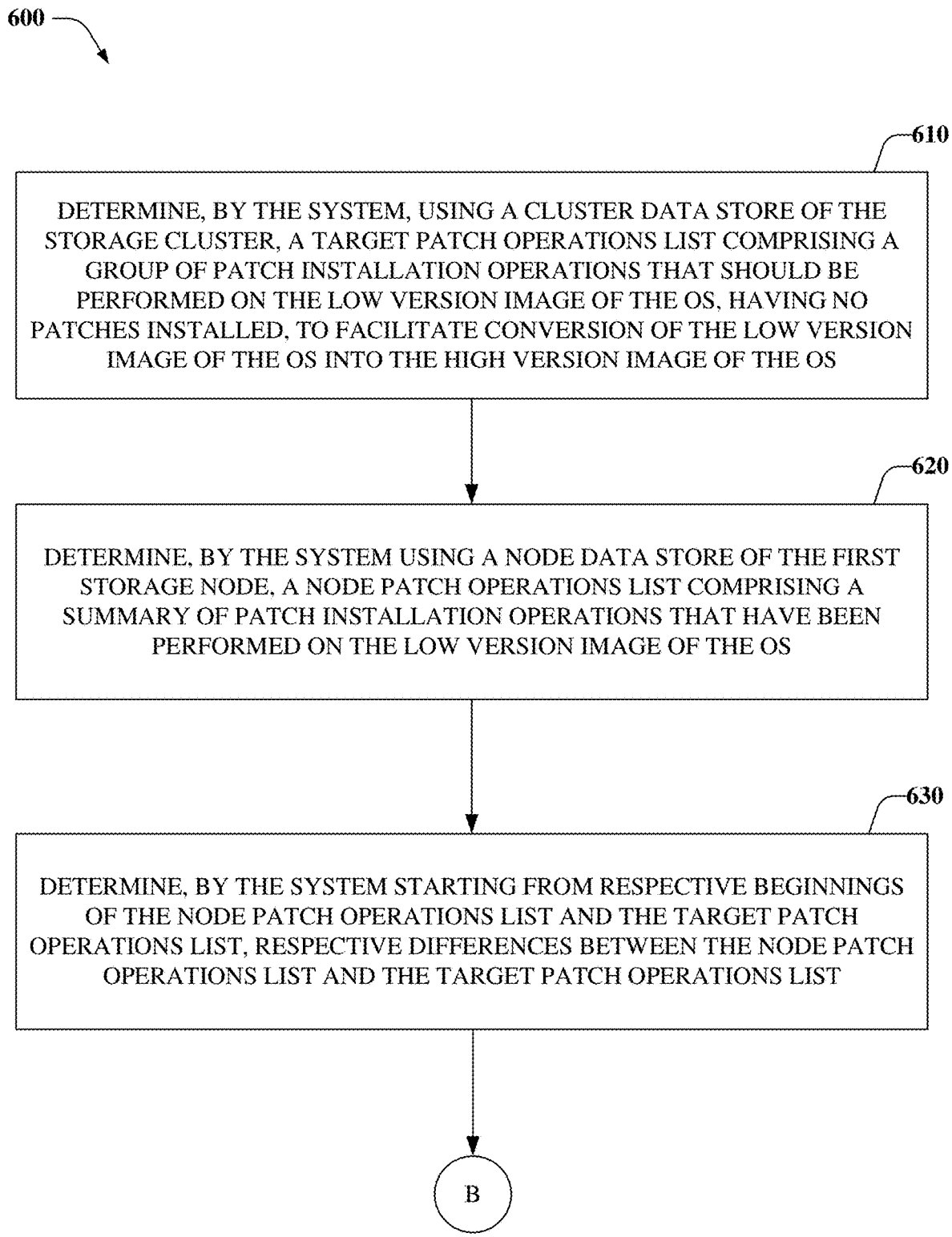
FIGS. 6-8 illustrate flow charts of a method for generating a patch reconciliation operations list, in accordance with various example embodiments.
Figure 7:
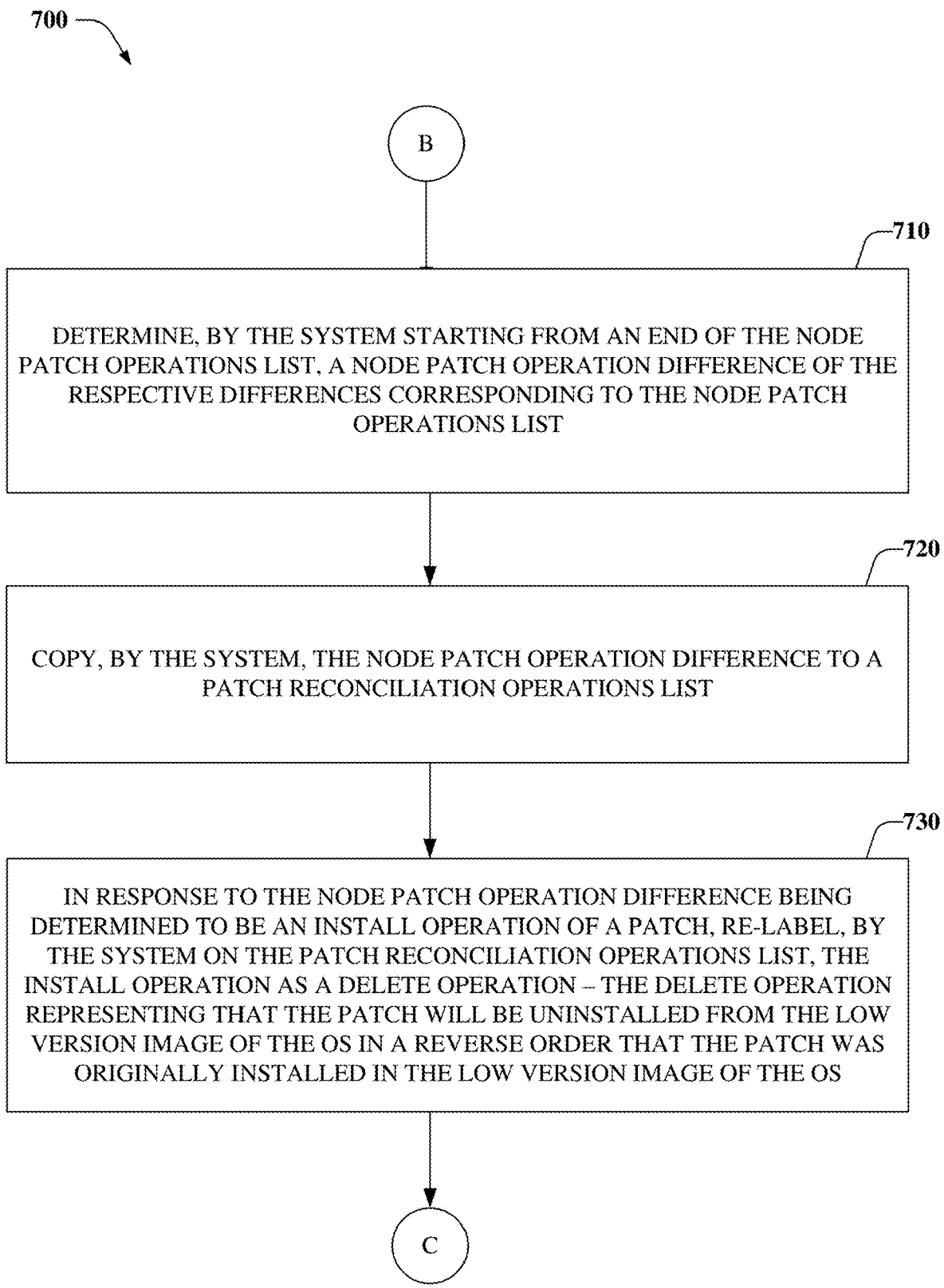
Figure 8:
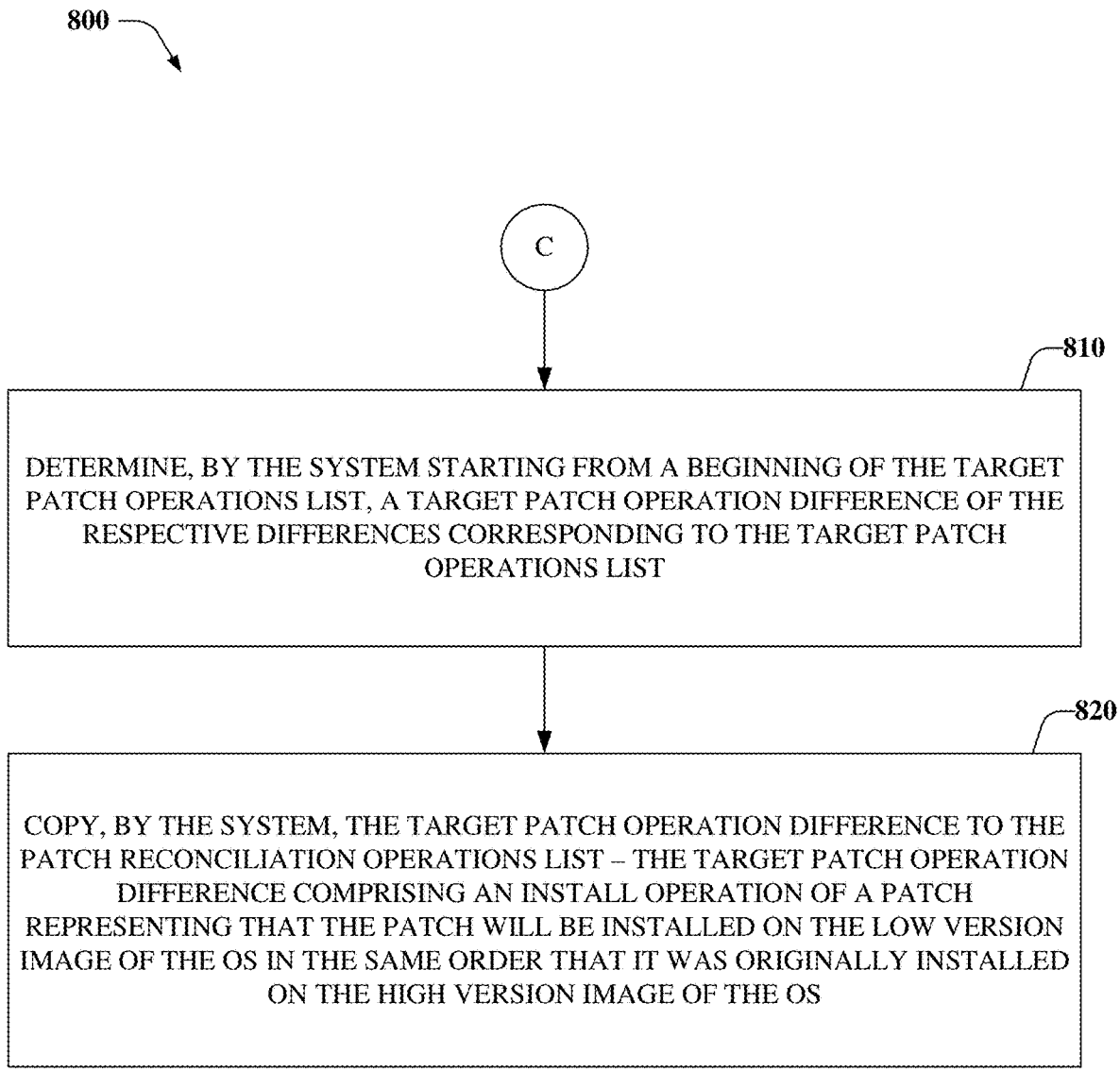

FIGS. 6-8 illustrate flow charts of a method for generating a patch reconciliation operations list, in accordance with various example embodiments. At 610, the system can determine, using a cluster data store of a storage cluster of the system, a target patch operations list comprising a group of patch installation operations that should be performed on the low version image of the OS, having no patches installed, to facilitate conversion of the low version image of the OS into the high version image of the OS.

At 620, the system can determine, using a node data store of the first storage node, a node patch operations list comprising a summary of patch installation operations that have been performed on the low version image of the OS.

At 630, the system can determine, starting from respective beginnings of the node patch operations list and the target patch operations list, respective differences between the node patch operations list and the target patch operations list.

Flow continues from 630 to 710, at which the system can determine, starting from an end of the node patch operations list, a node patch operation difference of the respective differences corresponding to the node patch operations list.

At 720, the system can copy the node patch operation difference to a patch reconciliation operations list. At 730, in response to the node patch operations difference being determined to be an install operation of a patch, the system can re-label the install operation as a delete operation on the patch reconciliation operations list. In this regard, the delete operation represents that the patch will be uninstalled from the low version image of the OS in a reverse order that the patch was originally installed in the low version image of the OS.

Flow continues from 730 to 810, at which the system can determine, starting from a beginning of the target patch operations list, a target patch operation difference of the respective differences corresponding to the target patch operations list.

At 820, the system can copy the target patch operation difference to the patch reconciliation operation list. In this regard, the target patch operation difference comprises an install operation of a patch representing that the patch will be installed on the low version image of the OS in the same order that it was originally installed on the high version image of the OS.

Figure 9:
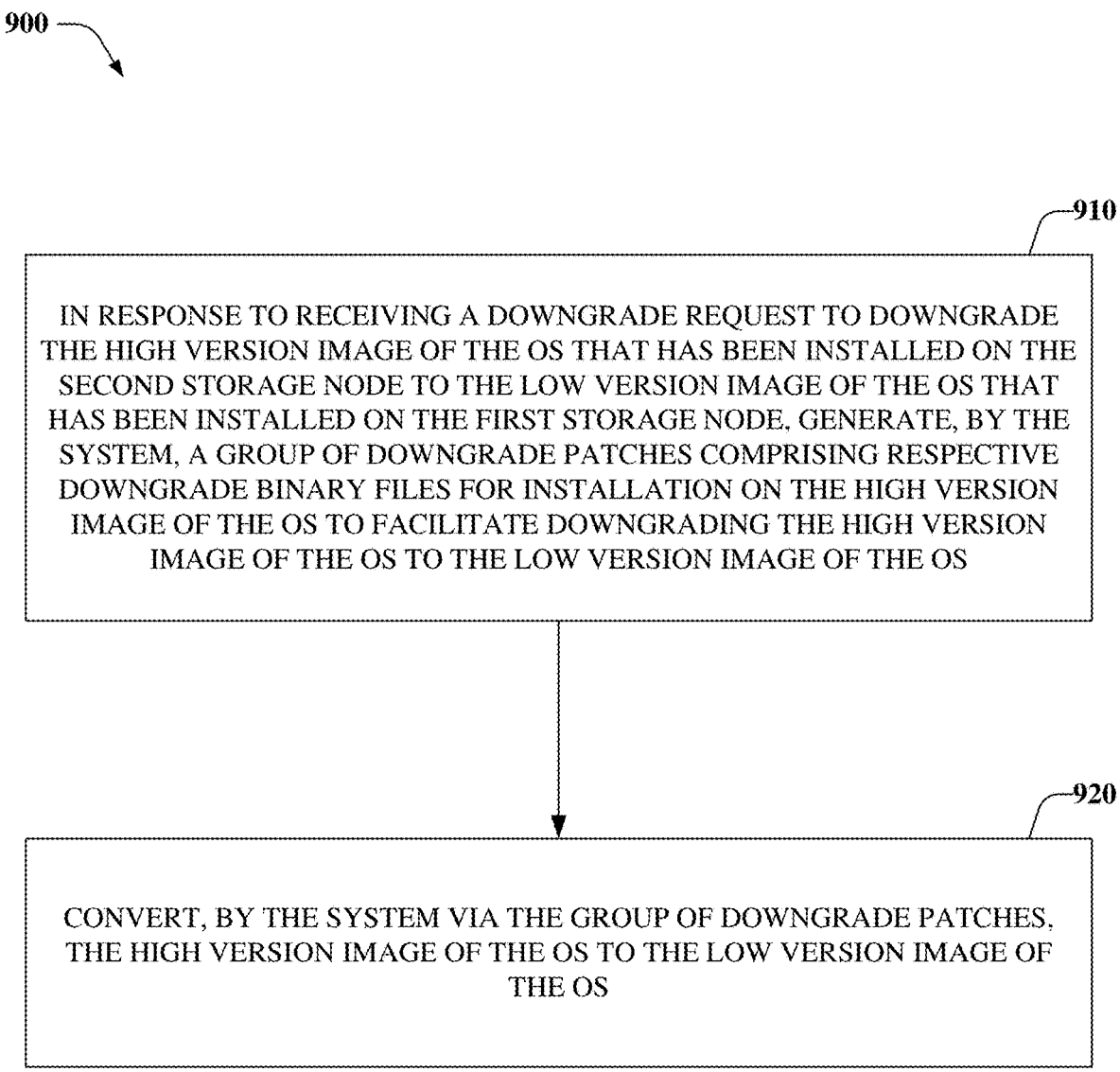
FIG. 9 illustrates a flow chart of a method that generates a group of downgrade patches comprising respective downgrade binary files for installation on a high version image of an OS that has been installed on a storage node of a storage cluster, in accordance with various example embodiments.

FIG. 9 illustrates a flow chart of a method that generates a group of downgrade patches comprising respective downgrade binary files for installation on a high version image of an OS that has been installed on a storage node of a storage cluster, in accordance with various example embodiments.

At 910, in response to receiving a downgrade request to downgrade the high version image of the OS that has been installed on the second storage node to the low version image of the OS that has been installed on the first storage node, the system can generate a group of downgrade patches comprising respective downgrade binary files for installation on the high version image of the OS to facilitate downgrading the high version image of the OS to the low version image of the OS. In turn, at 920, the system can convert, via the group of downgrade patches, the high version image of the OS to the low version image of the OS.

Reference throughout this specification to "one embodiment," or "an embodiment," means that a particular feature, structure, or characteristic described in connection with the embodiment is included in at least one embodiment. Thus, the appearances of the phrase "in one embodiment," or "in an embodiment," in various places throughout this specification are not necessarily all referring to the same embodiment. Furthermore, the particular features, structures, or characteristics may be combined in any suitable manner in one or more embodiments.

Furthermore, to the extent that the terms "includes," "has," "contains," and other similar words are used in either the detailed description or the appended claims, such terms are intended to be inclusive—in a manner similar to the term "comprising" as an open transition word—without precluding any additional or other elements. Moreover, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As utilized herein, the terms "logic", "logical", "logically", and the like are intended to refer to any information having the form of instruction signals and/or data that may be applied to direct the operation of a processor. Logic may be formed from signals stored in a device memory. Software is one example of such logic. Logic may also be comprised by digital and/or analog hardware circuits, for example, hardware circuits comprising logical AND, OR, XOR, NAND, NOR, and other logical operations. Logic may be formed from combinations of software and hardware. On a network, logic may be programmed on a server, or a complex of servers. A particular logic unit is not limited to a single logical location on the network.

As utilized herein, terms "component", "system", and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server, client, etc. and the server, client, etc. can be a component. One or more components can reside within a process, and a component can be localized on one computer and/or distributed between two or more computers.

Further, components can execute from various computer readable media having various data structures stored thereon. The components can communicate via local and/or remote processes such as in accordance with a signal having one or more data packets (e.g., data from one component interacting with another component in a local system, distributed system, and/or across a network, e.g., the Internet, with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. In yet another example, a component can be an apparatus that provides specific functionality through electronic components without mechanical parts; the electronic components can comprise one or more processors therein to execute software and/or firmware that confer(s), at least in part, the functionality of the electronic components.

Aspects of systems, apparatus, and processes explained herein can constitute machine-executable instructions embodied within a machine, e.g., embodied in a computer readable medium (or media) associated with the machine. Such instructions, when executed by the machine, can cause the machine to perform the operations described. Additionally, the systems, processes, process blocks, etc. can be embodied within hardware, such as an application specific integrated circuit (ASIC) or the like. Moreover, the order in which some or all of the process blocks appear in each process should not be deemed limiting. Rather, it should be understood by a person of ordinary skill in the art having the benefit of the instant disclosure that some of the process blocks can be executed in a variety of orders not illustrated.

Furthermore, the word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art having the benefit of the instant disclosure.

The disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can comprise, but are not limited to: random access memory (RAM); read only memory (ROM); electrically erasable programmable read only memory (EEPROM); flash memory or other memory technology (e.g., card, stick, key drive, thumb drive, smart card); solid state drive (SSD) or other solid-state storage technology; optical disk storage (e.g., compact disk (CD) read only memory (CD ROM), digital video/versatile disk (DVD), Blu-ray disc); cloud-based (e.g., Internet based) storage; magnetic storage (e.g., magnetic cassettes, magnetic tape, magnetic disk storage or other magnetic storage devices); a virtual device that emulates a storage device and/or any of the above computer-readable media; or other tangible and/or non-transitory media which can be used to store desired information. In this regard, the terms "tangible" or "non-transitory" herein as applied to storage, memory, or computer-readable media, are to be understood to exclude only propagating transitory signals per se as modifiers and do not relinquish rights to all standard storage, memory or computer-readable media that are not only propagating transitory signals per se.

As it is employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices. A processor may also be implemented as a combination of computing processing units.

In the subject specification, terms such as "data store", "data storage", "storage device", "storage medium", "database", and substantially any other information storage component relevant to operation and functionality of a system, component, and/or process, can refer to "memory components," or entities embodied in a "memory," or components comprising the memory. It will be appreciated that the memory components described herein can be either volatile memory or nonvolatile memory, or can comprise both volatile and nonvolatile memory.

By way of illustration, and not limitation, nonvolatile memory, for example, can be included in a node, a storage node, a data storage node, etc. (e.g., node 1 104(1), node 2 104(2), node N 104(N)), a node data base (e.g., node DB 1 106(1), node DB 2 106(2), node DB N 106(N)), a cluster DB (e.g., cluster DB 108), storage devices (e.g., 1040, 1042), non-volatile memory 1122 (see below), disk storage 1124 (see below), and/or memory storage 1146 (see below). Further, nonvolatile memory can be included in read only memory (ROM), programmable ROM (PROM), electrically programmable ROM (EPROM), electrically erasable ROM (EEPROM), or flash memory. Volatile memory (e.g., 1120) can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Figure 11:
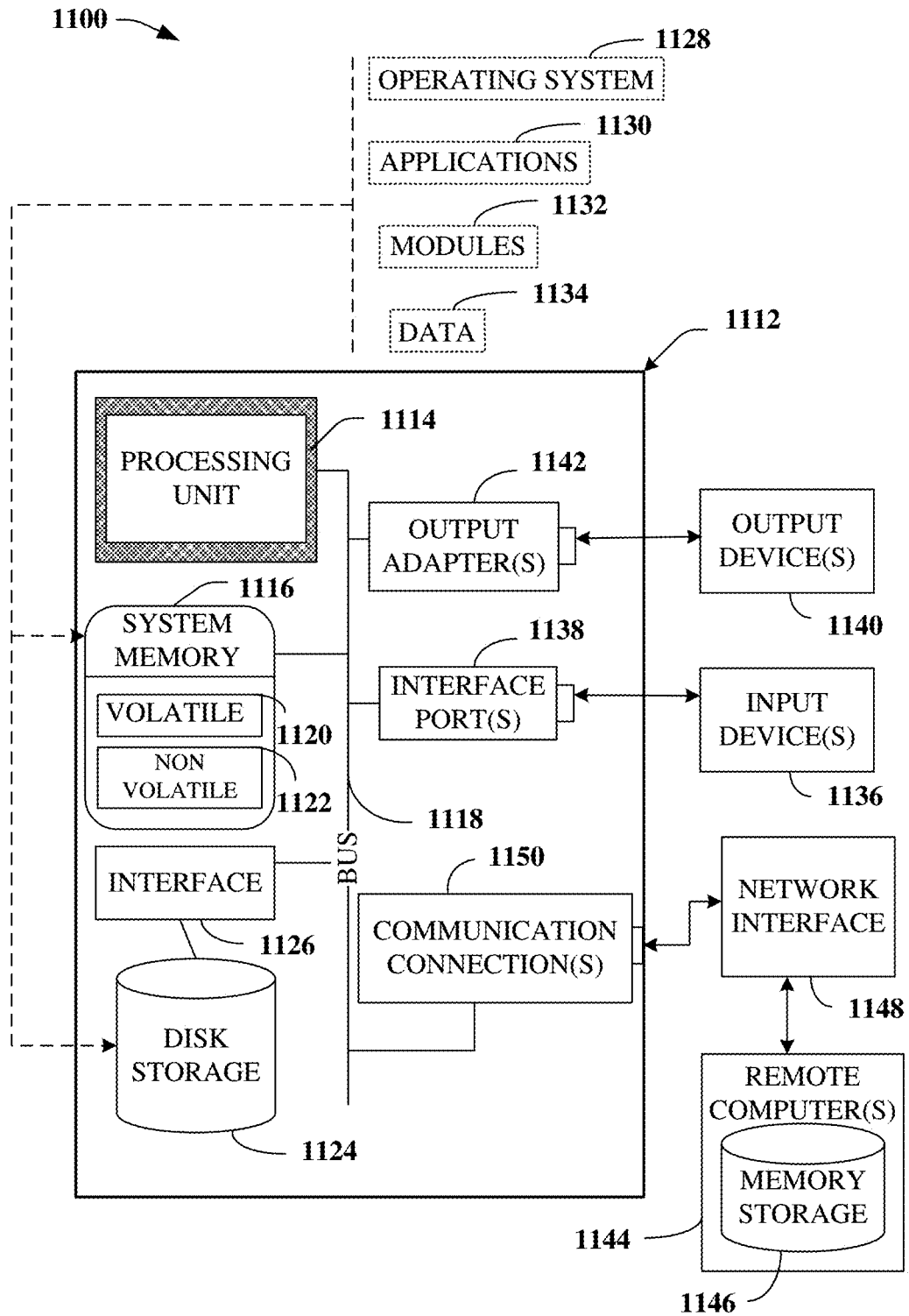
FIG. 11 illustrates a block diagram representing an illustrative non-limiting computing system or operating environment in which one or more aspects of various embodiments described herein can be implemented.

In order to provide a context for the various aspects of the disclosed subject matter, FIG. 11, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that various embodiments disclosed herein can be implemented in combination with other program modules. Generally, program modules comprise routines, programs, components, data structures, etc. that perform particular tasks and/or implement particular abstract data types.

Moreover, those skilled in the art will appreciate that the inventive systems can be practiced with other computer system configurations, comprising single-processor or multiprocessor computer systems, computing devices, mini-computing devices, mainframe computers, as well as personal computers, hand-held computing devices (e.g., PDA, phone, watch), microprocessor-based or programmable consumer or industrial electronics, and the like. The illustrated aspects can also be practiced in distributed computing environments where tasks are performed by remote processing devices that are linked through a communication network; however, some if not all aspects of the subject disclosure can be practiced on stand-alone computers. In a distributed computing environment, program modules can be located in both local and remote memory storage devices.

With reference to FIG. 11, a block diagram of a computing system 1100, e.g., 100, operable to execute the disclosed systems and methods is illustrated, in accordance with an embodiment. Computer 1112 comprises a processing unit 1114, a system memory 1116, and a system bus 1118. System bus 1118 couples system components comprising, but not limited to, system memory 1116 to processing unit 1114. Processing unit 1114 can be any of various available processors. Dual microprocessors and other multiprocessor architectures also can be employed as processing unit 1114.

System bus 1118 can be any of several types of bus structure(s) comprising a memory bus or a memory controller, a peripheral bus or an external bus, and/or a local bus using any variety of available bus architectures comprising, but not limited to, industrial standard architecture (ISA), micro-channel architecture (MSA), extended ISA (EISA), intelligent drive electronics (IDE), VESA local bus (VLB), peripheral component interconnect (PCI), card bus, universal serial bus (USB), advanced graphics port (AGP), personal computer memory card international association bus (PCMCIA), Firewire (IEEE 1394), small computer systems interface (SCSI), and/or controller area network (CAN) bus used in vehicles.

System memory 1116 comprises volatile memory 1120 and nonvolatile memory 1122. A basic input/output system (BIOS), containing routines to transfer information between elements within computer 1112, such as during start-up, can be stored in nonvolatile memory 1122. By way of illustration, and not limitation, nonvolatile memory 1122 can comprise ROM, PROM, EPROM, EEPROM, or flash memory. Volatile memory 1120 comprises RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1112 also comprises removable/non-removable, volatile/non-volatile computer storage media. FIG. 11 illustrates, for example, disk storage 1124. Disk storage 1124 comprises, but is not limited to, devices like a magnetic disk drive, floppy disk drive, tape drive, Jaz drive, Zip drive, LS-100 drive, flash memory card, or memory stick. In addition, disk storage 1124 can comprise storage media separately or in combination with other storage media comprising, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1124 to system bus 1118, a removable or non-removable interface is typically used, such as interface 1126.

It is to be appreciated that FIG. 11 describes software that acts as an intermediary between users and computer resources described in suitable operating environment 1100. Such software comprises an operating system 1128. Operating system 1128, which can be stored on disk storage 1124, acts to control and allocate resources of computer system 1112. System applications 1130 take advantage of the management of resources by operating system 1128 through program modules 1132 and program data 1134 stored either in system memory 1116 or on disk storage 1124. It is to be appreciated that the disclosed subject matter can be implemented with various operating systems or combinations of operating systems.

A user can enter commands or information into computer 1112 through input device(s) 1136. Input devices 1136 comprise, but are not limited to, a pointing device such as a mouse, trackball, stylus, touch pad, keyboard, microphone, joystick, game pad, satellite dish, scanner, TV tuner card, digital camera, digital video camera, web camera, cellular phone, user equipment, smartphone, and the like. These and other input devices connect to processing unit 1114 through system bus 1118 via interface port(s) 1138. Interface port(s) 1138 comprise, for example, a serial port, a parallel port, a game port, a universal serial bus (USB), a wireless based port, e.g., Wi-Fi, Bluetooth, etc. Output device(s) 1140 use some of the same type of ports as input device(s) 1136.

Thus, for example, a USB port can be used to provide input to computer 1112 and to output information from computer 1112 to an output device 1140. Output adapter 1142 is provided to illustrate that there are some output devices 1140, like display devices, light projection devices, monitors, speakers, and printers, among other output devices 1140, which use special adapters. Output adapters 1142 comprise, by way of illustration and not limitation, video and sound devices, cards, etc. that provide means of connection between output device 1140 and system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. Remote computer(s) 1144 can be a personal computer, a server, a router, a network PC, a workstation, a microprocessor based appliance, a peer device, or other common network node and the like, and typically comprises many or all of the elements described relative to computer 1112.

For purposes of brevity, only a memory storage device 1146 is illustrated with remote computer(s) 1144. Remote computer(s) 1144 is logically connected to computer 1112 through a network interface 1148 and then physically and/or wirelessly connected via communication connection 1150. Network interface 1148 encompasses wire and/or wireless communication networks such as local-area networks (LAN) and wide-area networks (WAN). LAN technologies comprise fiber distributed data interface (FDDI), copper distributed data interface (CDDI), Ethernet, token ring and the like. WAN technologies comprise, but are not limited to, point-to-point links, circuit switching networks like integrated services digital networks (ISDN) and variations thereon, packet switching networks, and digital subscriber lines (DSL).

Communication connection(s) 1150 refer(s) to hardware/software employed to connect network interface 1148 to bus 1118. While communication connection 1150 is shown for illustrative clarity inside computer 1112, it can also be external to computer 1112. The hardware/software for connection to network interface 1148 can comprise, for example, internal and external technologies such as modems, comprising regular telephone grade modems, cable modems and DSL modems, wireless modems, ISDN adapters, and Ethernet cards.

The computer 1112 can operate in a networked environment using logical connections via wired and/or wireless communications to one or more remote computers, cellular based devices, user equipment, smartphones, or other computing devices, such as workstations, server computers, routers, personal computers, portable computers, microprocessor-based entertainment appliances, peer devices or other common network nodes, etc. The computer 1112 can connect to other devices/networks by way of antenna, port, network interface adaptor, wireless access point, modem, and/or the like.

The computer 1112 is operable to communicate with any wireless devices or entities operatively disposed in wireless communication, e.g., a printer, scanner, desktop and/or portable computer, portable data assistant, communications satellite, user equipment, cellular base device, smartphone, any piece of equipment or location associated with a wirelessly detectable tag (e.g., scanner, a kiosk, news stand, restroom), and telephone. This comprises at least Wi-Fi and Bluetooth wireless technologies. Thus, the communication can be a predefined structure as with a conventional network or simply an ad hoc communication between at least two devices.

Wi-Fi allows connection to the Internet from a desired location (e.g., a vehicle, couch at home, a bed in a hotel room, or a conference room at work, etc.) without wires. Wi-Fi is a wireless technology similar to that used in a cell phone that enables such devices, e.g., mobile phones, computers, etc., to send and receive data indoors and out, anywhere within the range of a base station. Wi-Fi networks use radio technologies called IEEE 802.11 (a, b, g, etc.) to provide secure, reliable, fast wireless connectivity. A Wi-Fi network can be used to connect communication devices (e.g., mobile phones, computers, etc.) to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A system, comprising:
a processor; and
a memory that stores executable components that, when executed by the processor, facilitate performance of operations by the system, the operations comprising:
receiving an upgrade patch request to upgrade a first version of an operating system (OS) that has been installed on a first data storage node of a group of data storage nodes of a data storage cluster to a second version of the OS that has been installed on a second data storage node of the group of data storage nodes, the first version of the OS preceding the second version of the OS; and
based on the upgrade patch request,
determining a group of upgrade patches to apply to the first version of the OS to facilitate the upgrade of the first version of the OS, and
applying the group of upgrade patches to the first version of the OS resulting in the upgrade of the first version of the OS to the second version of the OS, wherein the group of upgrade patches comprises respective upgrade binary files for the first version of the OS, wherein a patch of OS version patches that have been applied to the first version of the OS will be uninstalled, from the first version of the OS in a reverse order from an order in which the patch was originally installed in the first version of the OS, in response to a patch install operation of the patch being determined to be an operational difference between the OS version patches and a target group of patches that are installed on an initial release of the first version of the OS, the initial release initially having no patches installed, to facilitate a change of the initial release of the first version of the OS to the second version of the OS.

2. The system of claim 1, wherein the determining of the group of upgrade patches to apply to the first version of the OS comprises:
reconciling patch differences between the OS version patches and the target group of patches.

3. The system of claim 2, wherein the reconciling of the patch differences comprises:
determining, from a cluster data structure of the data storage cluster, the target group of patches; and
generating a target patch operations list comprising non-duplicative target patch operations of the target group of patches.

4. The system of claim 3, wherein the OS version patches are first OS version patches, and wherein the operations further comprise:
determining, from a node data structure of the second data storage node, second OS version patches that have been applied to the second version of the OS that has been installed on the second data storage node; and
generating an actual patch operations list comprising non-duplicative second OS version patch operations of the second OS version patches.

5. The system of claim 4, wherein the operations further comprise:
based on the target operations list and the actual operations list, generating a final patch reconciliation list comprising an ordered list of patch operations to be applied to the first version of the OS to facilitate changing a state of the first version of the OS to a current state of the second version of the OS.

6. The system of claim 1, wherein the operations further comprise:
recording, in a node data structure of the first data storage node, the group of upgrade patches that was applied to the first version of the OS.

7. The system of claim 1, wherein the operations further comprise:
receiving a rollback patch request to roll back the second version of the OS to the first version of the OS that has been installed on the first data storage node; and
based on the roll back patch request,
determining a group of roll back patches to apply to the second version of the OS to facilitate the roll back of the second version of the OS, and
applying the group of roll back patches to the second version of the OS resulting in the roll back of the second version of the OS to the first version of the OS, the group of roll back patches comprising respective roll back binary files for the second version of the OS.

8. The system of claim 7, wherein the OS version patches are first OS version patches, and wherein the determining of the group of roll back patches to apply to the second version of the OS comprises:
determining, from a first node data structure of the second data storage node, a group of second OS version patches that have been applied to the second version of the OS; and
generating a second OS version patch list comprising non-duplicative patch operations of the group of second OS version patches that have been applied to the second version of the OS.

9. The system of claim 8, wherein the non-duplicative patch operations are first non-duplicative patch operations, and wherein the operations further comprise:
determining, from a second node data structure of the first data storage node, a group of first OS version patches that have been applied to the first version of the OS; and
generating a first OS version patch list comprising second non-duplicative patch operations of the group of first OS version patches that have been applied to the first version of the OS.

10. The system of claim 9, wherein the operations further comprise:
based on the second OS version patch list and the first OS version patch list, generating a final patch reconciliation list comprising an ordered list of patch operations to be applied to the second version of the OS to facilitate changing a state of the second version of the OS to a current state of the first version of the OS.

11. The system of claim 10, wherein the applying of the group of roll back patches to the second version of the OS comprises:
based on the final patch reconciliation list, uninstalling at least a portion of the group of second OS version patches from the second version of the OS.

12. The system of claim 11, wherein the operations further comprise:

recording, in the first node data structure of the second data storage node, the portion of the group of second OS version patches that were uninstalled from the second version of the OS.

13. A method, comprising:
in response to receiving an upgrade request to upgrade a low version image of an operating system (OS) that has been installed on a first storage node of a storage cluster to a high version image of the OS that has been installed on a second storage node of the storage cluster, generating, by a system comprising a processor, a group of upgrade patches comprising respective upgrade binary files for installation on the low version image of the OS, wherein the low version image precedes the high version image;
converting, by the system via the group of upgrade patches, the low version image of the OS to the high version image of the OS; and
in response to a difference in patch operations between patch installation operations that have been performed on the low version image of the OS and target patch installation operations that are performed on an initial release of the low version of the OS having no patches installed being determined to be an install operation of a patch, uninstalling the patch from the low version image of the OS in a reverse order from an order in which the patch was originally installed in the low version image of the OS.

14. The method of claim 13, wherein the generating of the group of upgrade patches comprises:
determining, using a cluster data store of the storage cluster, a target patch operations list comprising the target patch installation operations; and
determining, using a node data store of the first storage node, a node patch operations list comprising the patch installation operations that have been performed on the low version image of the OS.

15. The method of claim 14, further comprising:
generating, by the system, a patch reconciliation operations list, the generating the patch reconciliation operations list comprising
determining, starting from respective beginnings of the node patch operations list and the target patch operations list, respective differences between the node patch operations list and the target patch operations list,
determining, starting from an end of the node patch operations list, a node patch operation difference of the respective differences corresponding to the node patch operations list,
copying the node patch operation difference to the patch reconciliation operations list, and
in response to the node patch operation difference being determined to be the install operation of the patch, re-labeling on the patch reconciliation operations list, the install operation as a delete operation, wherein the delete operation represents that the patch will be uninstalled from the low version image of the OS in the reverse order that the patch was originally installed in the low version image of the OS.

16. The method of claim 15, wherein the patch is a first patch, wherein the install operation is a first install operation, and further comprising:
determining, by the system starting from a beginning of the target patch operations list, a target patch operation difference of the respective differences corresponding to the target patch operations list; and
copying, by the system, the target patch operation difference to the patch reconciliation operations list, wherein the target patch operation difference comprises a second install operation of a second patch representing that the second patch will be installed on the low version image of the OS in the same order that it was originally installed on the high version image of the OS.

17. The method of claim 13, further comprising:
in response to receiving a downgrade request to downgrade the high version image of the OS that has been installed on the second storage node to the low version image of the OS that has been installed on the first storage node, generating, by the system, a group of downgrade patches comprising respective downgrade binary files for installation on the high version image of the OS to facilitate downgrading the high version image of the OS to the low version image of the OS; and
converting, by the system via the group of downgrade patches, the high version image of the OS to the low version image of the OS.

18. The method of claim 17, further comprising:
based on the group of downgrade patches, generating a patch reconciliation list comprising an ordered list of patch operations to be applied to the high version image of the OS to facilitate, based on the patch reconciliation list, the converting the high version image of the OS to the low version image of the OS.

19. A non-transitory machine-readable medium comprising instructions that, in response to execution, cause a system comprising a processor to perform operations, comprising:
receiving a patch request to upgrade or downgrade a first image of a first version of an operating system (OS) to a second image of a second version of the OS, wherein the first image is installed on a first data storage node of a group of data storage nodes of a data storage cluster, and wherein the second image is installed on a second data storage node of the group of data storage nodes; and
in response to the patch request being determined to be compatible with the first image,
determining a group of patch operations to be performed on the first image to facilitate upgrading or downgrading the first image into the second image of the second version of the OS, and
based on the group of patch operations, upgrading or downgrading the first image into the second image, wherein during the upgrading, in response to a difference in patch operations between patch installation operations that have been performed on the first version of the OS and target patch installation operations that are performed on an initial release of the first version of the OS having no patches installed being determined to be an install operation of a patch, uninstalling the patch from the first version of the OS in a reverse order from an order in which the patch was originally installed in the first version of the OS.

20. The non-transitory machine-readable medium of claim 19, wherein the determining the group of patch operations comprises:
reconciling differences between node patch operations that have been performed on the first image and cluster patch operations that are expected to be performed on a high version image of the OS that has been installed on a portion of the group of data storage nodes of the data storage cluster.

\* \* \* \* \*